Patented Oct. 5, 1948

2,450,603

UNITED STATES PATENT OFFICE 2,450,603

METHOD OF DETERMINING A SLUDGE INDEX FOR ENGINE OILS

Edmond P. Lomasney, Bayside, Long Island, N. Y., assignor, by mesne assignments, to Ralph L. Faber, Los Angeles, Calif.

No Drawing. Application February 3, 1945, Serial No. 576,159

4 Claims. (Cl. 73—64)

This invention relates to a method of determining an index indicative of the presence or absence of certain sludge-forming constitutents in lubricating oils, such as are used in the crankcases of internal combustion engines and like oils.

Oil deterioration in internal combustion engine crankcases may be due to a number of different factors, one of which is oil oxidation. When oil deteriorates due to oxidation polymerization products are formed which are of varying particle size depending upon the conditions under which the oxidation proceeds. The oil in its initial state or unoxidized condition is made up of many individual molecules of varying size which are in a mutually soluble state. As polymerization proceeds the union of molecules and groups of molecules occurs in a type of "snowballing procedure" until products are formed representing progressive stages of oil deterioration. These may be generally classified in three groups (a) products composed of polymerized molecules which are probably still remaining in solution; (b) products composed of polymerized molecules or groups of molecules which are no longer in true solution but exist in the oil in a microscopic or colloidal state; and (c) products composed of large groups of polymerized molecules or aggregates thereof which are of somewhat larger particle size. The particles of the latter group are generally referred to as solids in that they have been readily separable from the oil by standardized centrifuge test methods and modifications thereof. The presence of solids in the oil or particles of the (c) group referred to above has been commonly determined by diluting a test sample of the oil with a prescribed amount of naphtha, petroleum ether, or similar diluent and centrifuging. This causes the oxidation products of large particle size or solids to be precipitated and collected in the end of the centrifuge tube where they may be measured volumetrically against graduations on the centrifuge tube.

While it is possible to determine the presence of polymerization products of the (a) and (b) groups referred to above by elaborate chemical and physical processes, this ordinarily is not done in making simple tests to determine the presence or absence of sludge-forming ingredients in ordinary engine oils as it cannot be done economically. The existence of the oxidation products of the (a) group and (b) group in addition to the solids of the (c) group is quite important in that the products of the (a) and (b) groups are in the process of becoming further polymerized into the solids of the (c) groups and are a definite and potent factor in the formation of sludge.

An object of the present invention is to provide a simple and economical method of determining the presence or absence of oxidation products of the (a) and (b) groups which have been polymerized to an initial and/or intermediate degree and to determine their presence quantitatively in the form of a sludge index or other similar means of expressing the determination which will be indicative of the likelihood of objectionable sludge forming in the oil so that suitable remedial steps may be taken.

As an incident to this determination the test may be effectively utilized for a measurement of the detergency present in oil wherein oxidized products and contaminants are dispersed to such a degree that they cannot be ascertained by the ordinary method of centrifuging a test sample of oil diluted with naphtha, petroleum ether, or the equivalent.

In making a test in accordance with the present invention I first determine the presence of solids or those oxidation products that have been highly polymerized and which form the (c) group referred to above. In so doing, I place 5 cc. of oil in a 15 cc. centrifuge tube and add thereto 8 cc. of naphtha, petroleum ether, or equivalent diluent. After mixing the oil and diluent thoroughly I centrifuge in the conventional manner which causes the solids or particles of the (c) group to precipitate in the bottom of the test tube where they can be visually measured againt graduations on the test tube walls. The quantity of solids thus precipitated may be determined in other manners, such as gravimetrically, although it is ordinarily adequate and much simpler to merely read the precipitate against the graduations on the test tube walls. The foregoing step may be regarded as a modification of the conventional or standard practice in determining the solid constituent of the oil when using the A. S. T. M. procedure for the precipitation number of lubricating oils.

When this step of the test is completed, I then add to the contents of the tube ½ cc. of a solution composed of 2% water and 98% aniline (C₆H₅NH₂) and thereafter mixing the contents of the test tube thoroughly I again centrifuge. The exact phenomena that takes place in the test sample during this second centrifuging I am not prepared to accurately explain. As a hypothesis however the aniline-water solution may function somewhat as a coagulant for the oxidation products of the (b) group referred to above which still remain dispersed throughout the oil and naphtha mixture after the first step of the test has been completed. I am also of the opinion that oxidation products of the (a) group are affected. Whatever the action of the aniline-water solution may be, I find that on subjecting the test tube contents to centrifuging that a further precipitation takes place if the oil contains oxidation products of the (a) or (b) group. This further precipitation which collects in the bottom of the test tube on top of the solids or oxidation products of the (c) group previously collected therein may be read also against the graduations on the test tube walls. This further precipitation expressed in percentage I designate as the sludge or oxidation index and as indicative of the presence of oxidation products that are present in the oil which heretofore have not been readily measurable. Metallic residues from fuel additives, fuel gums, atmospheric abrasives as well as products of incomplete fuel oxidation may also be measured with these products of oil deterioration.

The sludge index or oxidation index thus obtained or determined when considered in combination with other oil determinations may supply very accurate information as to the quantity and effect of the oxidized products which are in the oil but which have not heretofore been readily separable therefrom as solids. Thus, if these products of oxidation are sufficiently dispersed and are low in quantity their presence may be ignored as not being detrimental to continued use of the oil. For example, if the solid constituent of the oil amounts to merely .3% by volume and the sludge index is 1.0% of the test sample, continued use of the oil can be safely permitted. If the sludge is low in quantity but not dispersed, or it is high in quantity but is well dispersed, servicing of the oil filter and a purge will probably eliminate it from the crankcase. Typical values of the solids and sludge index under such circumstances are 1.0% solids and 1.5% sludge index for a situation wherein the sludge is low in quantity but not dispersed and .3% solids and 5.0% sludge index when it is high in quantity but well dispersed. Where the sludge indications are high in quantity and without dispersion the entire crankcase or pan should be removed and thoroughly cleaned out. A typical example of oil under such circumstances is 3.0% solids and 5.0% sludge index. Such a remedy is to be recommended with these values. It is not uncommon however for there to be as high as 5.0% solids and 20.0% sludge index.

From the above-described procedure it will be appreciated that an improved method of testing lubricating oils has been developed which will indicate not only those products produced from oxidation which have proceeded to such an extent that the products have been polymerized into segregatable solids but which will indicate also those products of oxidation which have been polymerized to such an extent that they can be readily segregated on merely diluting the sample with naphtha or the equivalent and centrifuging. The presence of the products of the (a) and (b) groups which have not heretofore been readily measurable is an important factor in determining the necessity for or the desirability of taking remedial steps.

It will, of course, be appreciated that in making this test the percentage of naphtha or other diluent added to the sample of oil to precipitate the solids on centrifuging in the first step may be varied and that the percentage which I have selected is somewhat arbitrary. Likewise the relationship of aniline to water may be varied from the percentages given in the second step. The percentages of 98% aniline and 2% water are not critical but have been arbitrarily selected. However, if the water is materially decreased below 2% apparently there will not be sufficient to bring down all of the available products of oxidation forming the (a) or (b) groups referred to above. Also, if the aniline is present in excess of 98% very little is gained by having this excess of aniline present. The adding of ½ cc. of the water-aniline solution may likewise be varied. In conducting a series of tests, however, which are to be compared or contrasted, the same procedure should be applied to all.

It will, of course, be appreciated that the effect of the centrifuging is merely to hastily bring about a precipitation of the precipitatable constituents. If time is of no consequence these constituents might be precipitative by gravity.

While I prefer to conduct my test in two separate steps so as to determine the amount of products forming group (c) separate from those forming group (a) and/or (b), it will, of course be appreciated that the two steps might be carried on simultaneously. That is, the naphtha and aniline solution could be simultaneously added to the test sample of oil and the sample subjected to a single centrifuging. The precipitate thus obtained of course would be a combination of all of the products which form groups (a), (b), and (c). Normally, however, it is desirable to segregate group (c) from the products of groups (a) and/or (b) by the two-step process above-described.

Various changes may be made in the steps of the procedure without departing from the spirit and scope of the invention as defined by the appended claims.

I claim:

1. The method of determining the detergency and/or a sludge index for oils which have been subjected to oxidation which includes the step of subjecting the test sample of the oil to a solution of water and aniline in the approximate proportions of 2% water and 98% aniline and centrifuging said sample and determining the separation thus effected.

2. The method of determining the detergency and/or a sludge index for oils which includes diluting a test sample of the oil with naphtha and centrifuging and noting the amount of solids thus precipitated, adding to the diluted sample a solution of water and aniline, and again centrifuging and noting the amount of precipitate effected by the second centrifuging.

3. The method of determining detergency and/or a sludge index for oils which includes diluting a test sample of the oil with a solvent such as naphtha and centrifuging, and thereafter adding to the diluted sample water and aniline and again centrifuging and noting the amount of precipitate effected.

4. The method of determining detergency and/or a sludge index for oils which includes diluting a test sample of the oil with a solvent such as naphtha and centrifuging, and thereafter adding to the diluted sample water and aniline and again centrifuging and noting the amount of precipitate effected by both centrifugings.

EDMOND P. LOMASNEY.

REFERENCES CITED

The following references are of record in the file of this patent:

UNITED STATES PATENTS

| Number | Name | Date |
|---|---|---|
| 270,489 | Schubert | Jan. 9, 1883 |
| 1,281,354 | Handy | Oct. 15, 1918 |
| 1,363,784 | Hapgood | Dec. 28, 1920 |
| 1,747,161 | Clark | Feb. 18, 1930 |
| 2,162,195 | Greensfelder et al. | June 13, 1939 |
| 2,303,546 | Greger | Dec. 1, 1942 |

OTHER REFERENCES

The Standard Method of Test for Precipitation Number of Lubricating Oils, A. S. T. M. Designation: D91—40, adopted 1933; revised 1935, 1940; published as tentative from 1921 to 1933; being revised in 1929 and 1930. This paper is published by the American Society for Testing Materials, 260 S. Broad St., Philadelphia, Pa., and is included in the 1940 Supplement, Part III, Non-metallic Materials—General, at pages 72-74.